(12) United States Patent
Katou et al.

(10) Patent No.: US 10,138,839 B2
(45) Date of Patent: Nov. 27, 2018

(54) CONTROL SYSTEM FOR AN INTERNAL COMBUSTION ENGINE

(71) Applicant: TOYOTA JIDOSHA KABUSHIKI KAISHA, Toyota-shi, Aichi (JP)

(72) Inventors: Yuuichi Katou, Susono (JP); Makoto Tomimatsu, Susono (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 127 days.

(21) Appl. No.: 15/329,612

(22) PCT Filed: Jul. 15, 2015

(86) PCT No.: PCT/JP2015/003581
§ 371 (c)(1),
(2) Date: Jan. 27, 2017

(87) PCT Pub. No.: WO2016/017102
PCT Pub. Date: Feb. 4, 2016

(65) Prior Publication Data
US 2017/0211500 A1 Jul. 27, 2017

(30) Foreign Application Priority Data
Aug. 1, 2014 (JP) ................................. 2014-158013

(51) Int. Cl.
*F02D 41/30* (2006.01)
*F02D 41/22* (2006.01)
(Continued)

(52) U.S. Cl.
CPC ..... *F02D 41/3094* (2013.01); *F02D 41/0047* (2013.01); *F02D 41/0065* (2013.01);
(Continued)

(58) Field of Classification Search
CPC ............. F02D 41/0047; F02D 41/0052; F02D 41/0065; F02D 41/0072; F02D 41/0075;
(Continued)

(56) References Cited

U.S. PATENT DOCUMENTS

| 2005/0211519 A1 | 9/2005 | Maligne et al. |
| 2006/0011165 A1* | 1/2006 | Frey ...................... F02B 17/005 |
| | | 123/299 |
| 2011/0239997 A1* | 10/2011 | Surnilla ................ F01N 3/2066 |
| | | 123/568.21 |

FOREIGN PATENT DOCUMENTS

| DE | 103 07 166 A1 | 9/2004 |
| JP | 2010-270669 A | 12/2010 |

* cited by examiner

*Primary Examiner* — Hung Q Nguyen
*Assistant Examiner* — Mark L Greene
(74) *Attorney, Agent, or Firm* — Sughrue Mion, PLLC

(57) ABSTRACT

There is provided a controller configured to carry out at least one of first control and second control, in cases where the internal combustion engine is in a predetermined operating state in which the EGR valve is caused to be fully closed, the first control being that an amount of fuel to be injected into an intake passage is made smaller, and an amount of fuel to be injected into a cylinder is made larger, in the presence of the abnormality of the EGR valve being not fully closed than in the absence of the abnormality, and the second control being that a pressure of fuel to be injected into the cylinder is made higher in the presence of the abnormality of the EGR valve being not fully closed than in the absence of the abnormality.

4 Claims, 7 Drawing Sheets

(51) Int. Cl.
  *F02D 41/00*    (2006.01)
  *F02M 26/49*    (2016.01)
  *F02M 26/00*    (2016.01)
(52) U.S. Cl.
  CPC ........... *F02D 41/221* (2013.01); *F02M 26/49* (2016.02); *F02M 2026/006* (2016.02); *Y02T 10/47* (2013.01)
(58) Field of Classification Search
  CPC ............... F02D 41/1495; F02D 41/221; F02D 41/3094; F02M 26/49; F02M 2026/005; F02M 2026/006
  See application file for complete search history.

[Fig. 1]
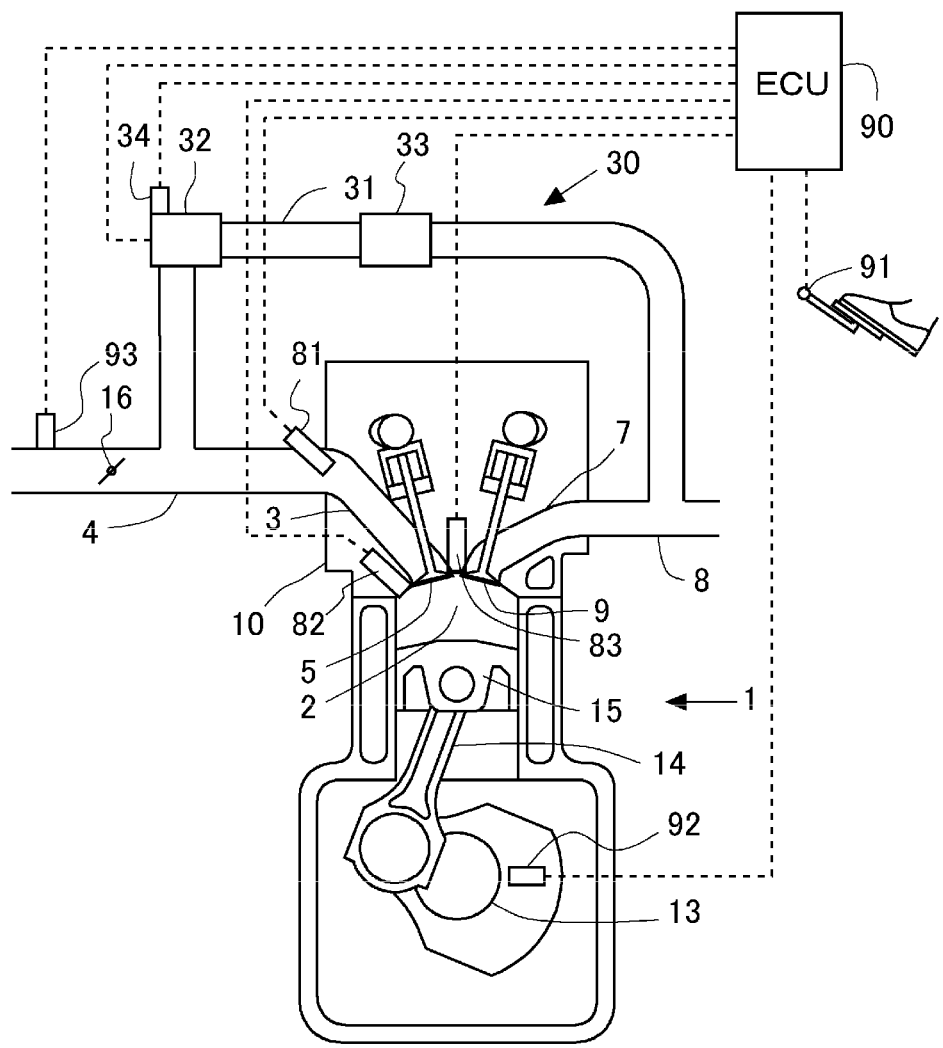

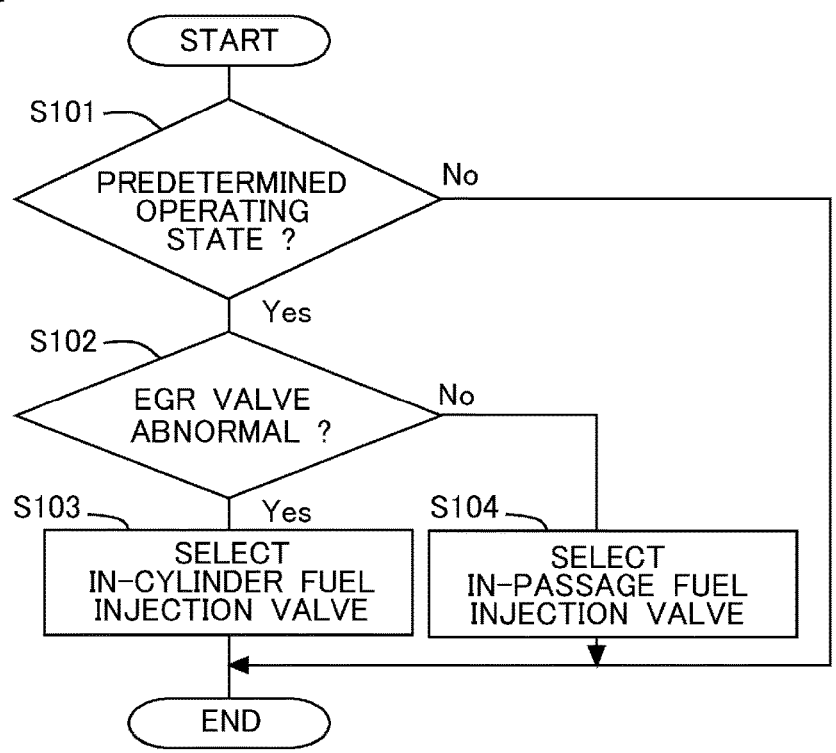
[Fig. 2]

[Fig. 3]
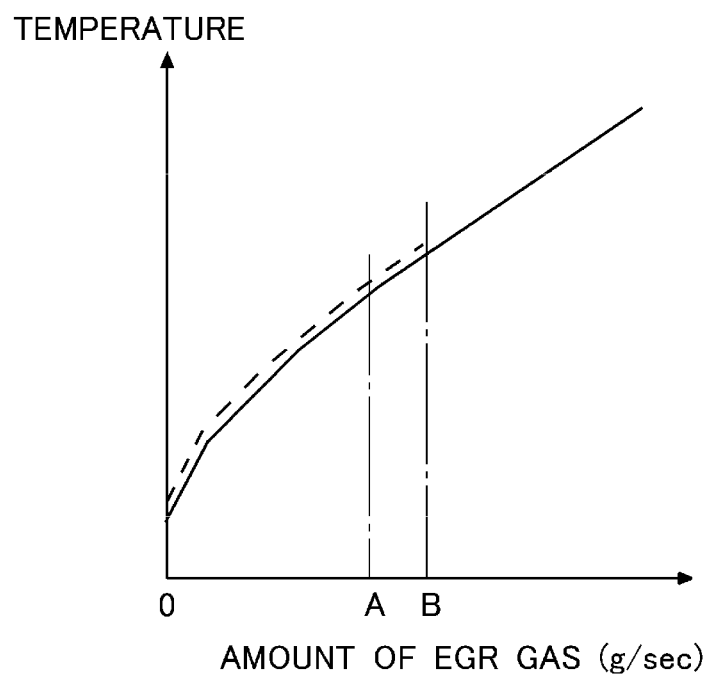

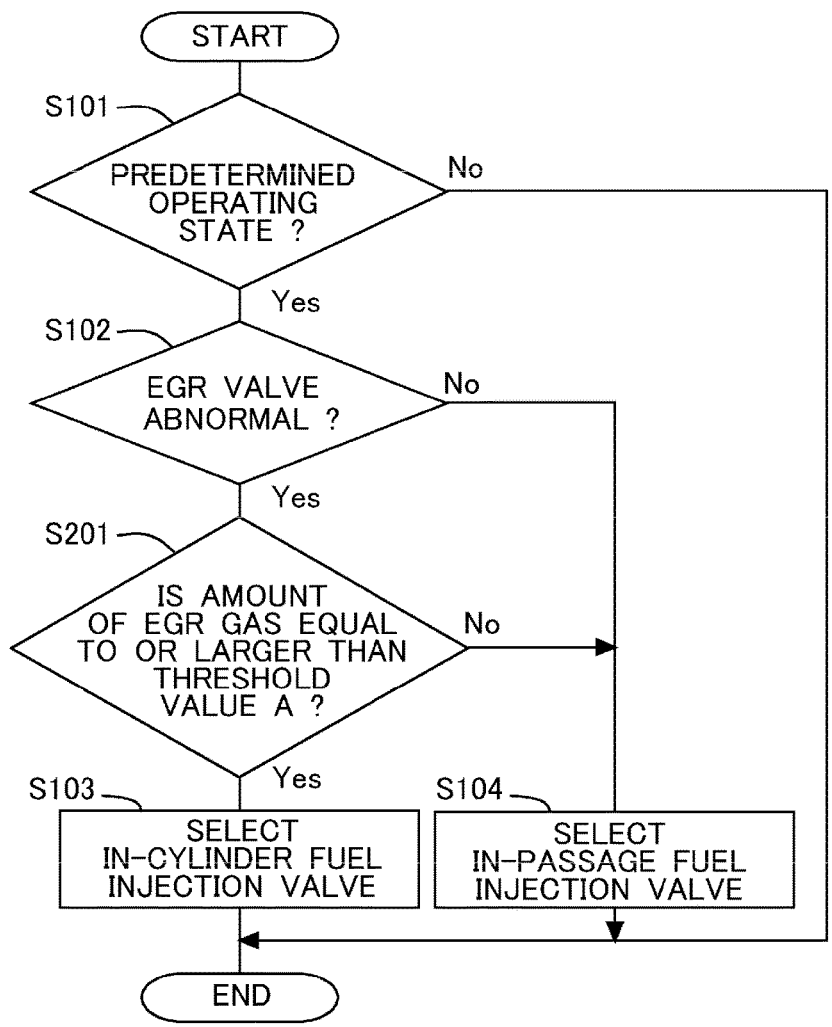
[Fig. 4]

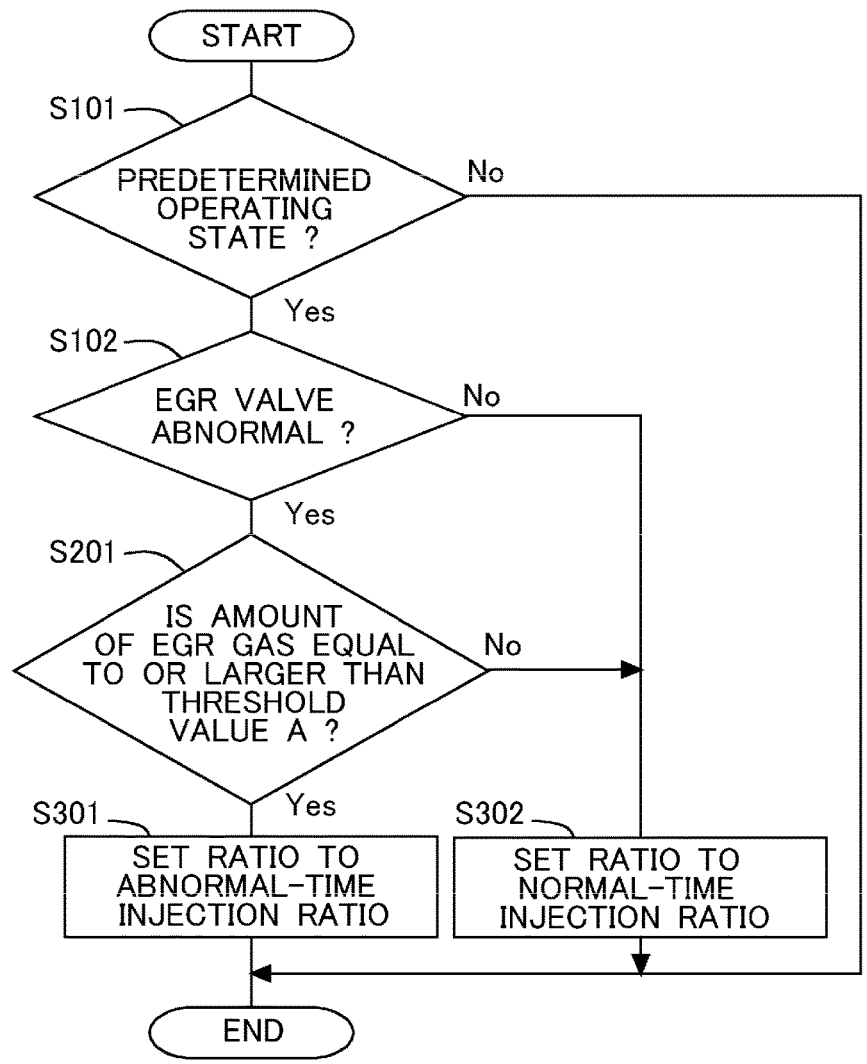
[Fig. 5]

[Fig. 6]
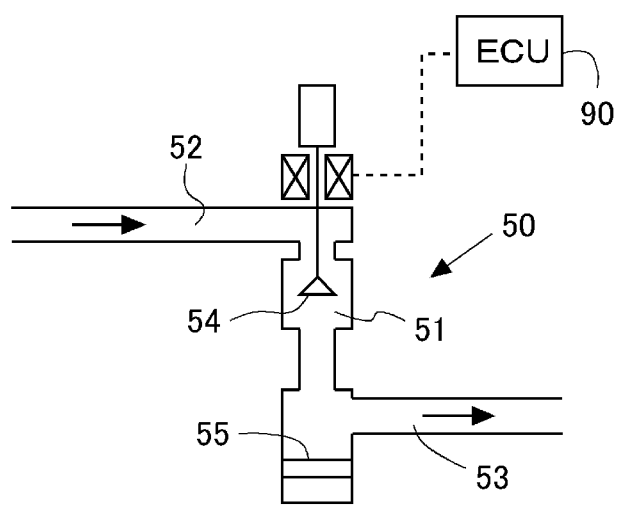

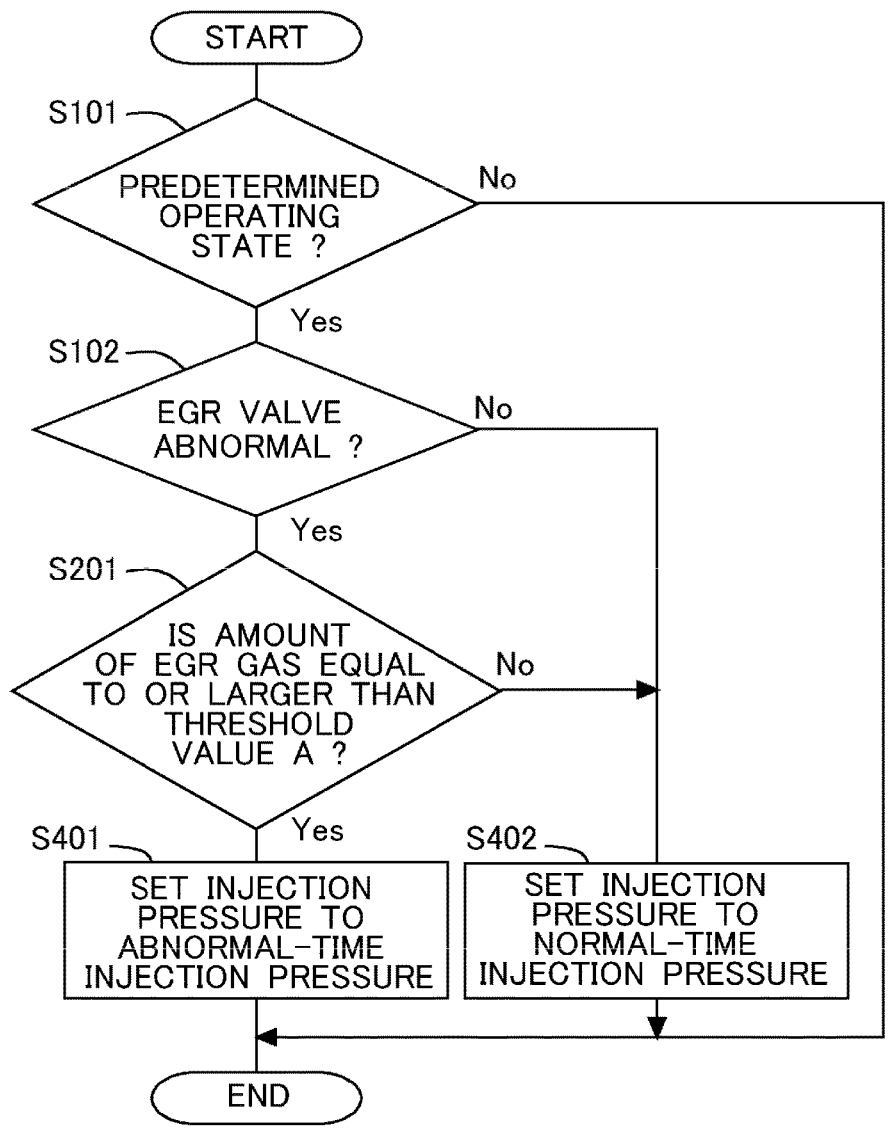
[Fig. 7]

CONTROL SYSTEM FOR AN INTERNAL COMBUSTION ENGINE

CROSS REFERENCE TO RELATED APPLICATIONS

This application is a National Stage of International Application No. PCT/JP2015/003581, filed Jul. 15, 2015, claiming priority based on Japanese Patent Application No. 2014-158013, filed Aug. 1, 2014, the contents of all of which are incorporated herein by reference in their entirety.

TECHNICAL FIELD

The present disclosure relates to a control system for an internal combustion engine.

BACKGROUND ART

It is known that provision is made for an in-cylinder fuel injection valve that serves to inject fuel into a cylinder of an internal combustion engine, and an in-passage fuel injection valve that serves to inject fuel into an intake passage (an intake port) of the internal combustion engine, wherein in cases where an abnormality is detected in which the temperature of an EGR gas becomes high, the rise in temperature of resin parts, etc., is suppressed by increasing the amount of fuel injection from the in-passage fuel injection valve, or the occurrence of knocking is suppressed by increasing the amount of fuel injection from the in-cylinder fuel injection valve (for example, refer to a first patent literature).

CITATION LIST

Patent Literature

[PTL 1] Japanese patent laid-open publication No. 2010-270669

SUMMARY

Technical Problem

Here, fuel of high pressure is injected from the in-cylinder fuel injection valve, and so, when the fuel of high pressure is injected from the in-cylinder fuel injection valve, a loud operation sound occurs. When the internal combustion engine is in idle operation, combustion noise or the like becomes relatively small, and the operation sound of the in-cylinder fuel injection valve becomes relatively large and hence conspicuous. For this reason, during the idle operation of the internal combustion engine, fuel may be injected from the in-passage fuel injection valve, without being injected from the in-cylinder fuel injection valve.

However, in cases where the internal combustion engine is provided with an EGR device having an EGR valve, the EGR valve may not be fully closed due to sticking of the EGR valve or biting of foreign matter into the EGR valve. At the time of idling operation of the internal combustion engine, the EGR valve is fully closed in order to suppress deterioration of a combustion state, but if the EGR valve can not be fully closed at this time, EGR gas will flow through the EGR valve. Besides, at the time of idling operation of the internal combustion engine, negative pressure at the side of the intake passage becomes large, so that when the EGR valve is open even a little bit, a large amount of EGR gas will flow through the EGR valve. For this reason, there is a fear that the combustion state may deteriorate or the rotation speed of the internal combustion engine may drop. Moreover, at the time of idling operation of the internal combustion engine, the speed of a piston is slow, so mixing of air and fuel does not proceed effectively, and even if the amount of fuel injection is increased, there is also a fear that the combustion state may deteriorate.

The present disclosure has been made in view of the problems as mentioned above, and the object of the disclosure is to suppress deterioration of a combustion state, in cases where there is an abnormality in which an EGR valve can not be fully closed, despite that an internal combustion engine is in an operating state in which the EGR valve is caused to be fully closed.

Solution to Problem

In order to achieve the above-mentioned object, the present disclosure resides in a control system for an internal combustion engine which comprises:

an in-passage fuel injection valve configured to inject fuel into an intake passage of the internal combustion engine;

an in-cylinder fuel injection valve configured to inject fuel into a cylinder of said internal combustion engine;

an EGR device that has an EGR passage connecting between an exhaust passage and the intake passage of said internal combustion engine, and an EGR valve for opening and closing the EGR passage; and a controller configured to carry out at least one of first control and second control, in cases where said internal combustion engine is in a predetermined operating state in which said EGR valve is caused to be fully closed when a rotation speed of said internal combustion engine is equal to or less than a predetermined rotation speed and when a load of said internal combustion engine is equal to or less than a predetermined load, said first control being that an amount of fuel to be injected from said in-passage fuel injection valve is made smaller, and an amount of fuel to be injected from said in-cylinder fuel injection valve is made larger, in the case where there is an abnormality in which said EGR valve is not fully closed, than in the case where there is no said abnormality, and said second control being that a pressure of fuel to be injected from said in-cylinder fuel injection valve is made higher, in the case where there is an abnormality in which said EGR valve is not fully closed, than in the case where there is no said abnormality.

The predetermined operating state is an operating state in which the EGR valve is caused to be fully closed, and in which there is a fear that if the EGR valve is opened, the combustion state deteriorates or may deteriorate. Accordingly, the predetermined rotation speed and the predetermined load are a rotation speed of the internal combustion engine and an engine load, respectively, in which there is a fear that the combustion state deteriorates or may deteriorate by opening the EGR valve. The predetermined operating state may also be an operating state which is an idling operation state or which is close to an idling operation state. In such a predetermined operating state, the deterioration of the combustion state is suppressed by fully closing the EGR valve. However, when the internal combustion engine is in the predetermined operating state, a difference in pressure (differential pressure) between the exhaust passage and the intake passage is large, and hence, when an abnormality has occurred in which the EGR valve is not fully closed, a large amount of EGR gas may flow, even though the degree of opening of the EGR valve is small, so that the combustion state can be deteriorated.

Here, when fuel is caused to be injected from the in-cylinder fuel injection valve, a gas flow inside a cylinder can be promoted by the penetration force of the fuel. As a result of this, the mixing of air and fuel can be promoted, thus making it possible to suppress the deterioration of the combustion state. That is, in cases where fuel has not been caused to be injected from the in-cylinder fuel injection valve, the deterioration of the combustion state can be suppressed by injecting fuel from the in-cylinder fuel injection valve. In addition, in cases where fuel is caused to be injected from both the in-cylinder fuel injection valve and the in-passage fuel injection valve, the deterioration of the combustion state can be suppressed, by increasing the amount of fuel to be injected from the in-cylinder fuel injection valve, while decreasing the amount of fuel to be injected from the in-passage fuel injection valve by the amount of fuel thus increased. Moreover, by making higher the pressure of fuel to be injected from the in-cylinder fuel injection valve, the gas flow can be promoted to a further extent, thereby making it possible to suppress the deterioration of the combustion state.

On the other hand, in cases where the EGR valve is fully closed in a normal manner, noise can be reduced by decreasing the amount of fuel injection from the in-cylinder fuel injection valve, or decreasing the pressure of fuel to be injected from the in-cylinder fuel injection valve.

Here, note that decreasing the amount of fuel to be injected from the in-passage fuel injection valve can include a case in which fuel is caused not to be injected from the in-passage fuel injection valve. In addition, increasing the amount of fuel to be injected from the in-cylinder fuel injection valve can include a case in which the state of not injecting fuel from the in-cylinder fuel injection valve is changed to the state of injecting fuel from the in-cylinder fuel injection valve.

In addition, said controller may carry out neither said first control nor said second control when the amount of EGR gas flowing into said cylinder is less than a threshold value, even in the case where said internal combustion engine is in said predetermined operating state, and in the case where there is said abnormality.

Said threshold value for the amount of EGR gas can be set to an amount of EGR gas at which the combustion state deteriorates, or an amount of EGR gas at which there is a fear that the combustion state may deteriorate, or an amount of EGR gas at the time when the deterioration of the combustion state exceeds an allowable range. Moreover, said threshold value for the amount of EGR gas may also be an amount of EGR gas which is smaller by a certain margin than an amount of EGR gas at which a drop in the rotation speed of the internal combustion engine takes place. In the case where the internal combustion engine is in the predetermined operating state, even if the EGR gas flows into the cylinder, the combustion state may not be deteriorated, or the combustion state, if deteriorated, may be within the allowable range. In such a case, noise can be reduced by not increasing the amount of fuel to be injected from the in-cylinder fuel injection valve, or by not making high the pressure of fuel to be injected from the in-cylinder fuel injection valve.

Moreover, in the case of carrying out said first control, said controller may also decrease the amount of fuel to be injected from said in-passage fuel injection valve and at the same time increase the amount of fuel to be injected from said in-cylinder fuel injection valve, in accordance with the increasing amount of EGR gas flowing into said cylinder.

Here, in the case where the internal combustion engine is in the predetermined operating state, the more the amount of EGR gas flowing into the cylinder becomes, the easier the combustion state therein is to deteriorate. In contrast to this, the more the amount of fuel to be injected from the in-cylinder fuel injection valve is made, the larger the effect of improving the combustion state becomes. Accordingly, the more the amount of EGR gas, the more the amount of fuel to be injected from the in-cylinder fuel injection valve is made, whereby it becomes possible to perform the fuel injection according to the degree of deterioration of the combustion state. Moreover, it is possible to suppress an amount of fuel more than necessary from being injected from the in-cylinder fuel injection valve, thus making it possible to reduce noise.

Further, in the case of carrying out said second control, said controller may also make the pressure of fuel to be injected from said in-cylinder fuel injection valve higher in accordance with the increasing amount of EGR gas flowing into said cylinder.

Here, in the case where the internal combustion engine is in the predetermined operating state, the more the amount of EGR gas flowing into the cylinder becomes, the easier the combustion state therein is to deteriorate. In contrast to this, the higher the pressure of fuel to be injected from the in-cylinder fuel injection valve is made, the larger the effect of improving the combustion state becomes. Accordingly, the more the amount of EGR gas, the higher the pressure of fuel to be injected from the in-cylinder fuel injection valve is made, whereby it becomes possible to perform the fuel injection according to the degree of deterioration of the combustion state. Moreover, it is possible to suppress the pressure of fuel from being made higher than necessary, thus making it possible to reduce noise.

Advantageous Effects of Disclosure

According to the present disclosure, it is possible to suppress deterioration of a combustion state, in cases where there is an abnormality in which an EGR valve can not be fully closed, despite that an internal combustion engine is in an operating state in which the EGR valve is caused to be fully closed.

BRIEF DESCRIPTION OF DRAWINGS

FIG. 1 is a view showing the schematic construction of an internal combustion engine according to a first embodiment of the present disclosure.

FIG. 2 is a flow chart showing a flow for fuel injection control according to the first embodiment of the present disclosure.

FIG. 3 is a view showing the relation between the amount of EGR gas and the temperature of a catalyst at the time of idling operation.

FIG. 4 is a flow chart showing a flow for fuel injection control according to a second embodiment of the present disclosure.

FIG. 5 is a flow chart showing a flow for fuel injection control according to a third embodiment of the present disclosure.

FIG. 6 is a view showing the schematic construction of a high pressure fuel pump.

FIG. 7 is a flow chart showing a flow for fuel injection control according to a fourth embodiment of the present disclosure.

DESCRIPTION OF EMBODIMENTS

Hereinafter, modes for carrying out the present disclosure will be exemplarily described in detail based on preferred embodiments with reference to the attached drawings. However, the dimensions, materials, shapes, relative arrangements and so on of component parts described in the embodiments are not intended to limit the scope of the present disclosure to these alone in particular as long as there are no specific statements.

(First Embodiment)

FIG. 1 is a view showing the schematic construction of an internal combustion engine 1 according to a first embodiment of the present disclosure. Here, note that in this embodiment, in order to illustrate the internal combustion engine 1 in a simple and concise manner, a part of components thereof is omitted. The internal combustion engine 1 is a gasoline engine.

An intake pipe 4 is connected to a combustion chamber in each cylinder 2 through an intake port 3 formed in a cylinder head 10 thereof. An intake valve 6 is arranged at a combustion chamber side end of the intake port 3. On the other hand, an exhaust pipe 8 is connected to the combustion chamber in each cylinder 2 through an exhaust port 7 formed in the cylinder head 10 thereof. An exhaust valve 9 is arranged at a combustion chamber side end of the exhaust port 7. Here, note that in this embodiment, the intake port 3 or the intake pipe 4 corresponds to an intake passage in the present disclosure.

Then, a piston 15 connected to a crankshaft 13 of the internal combustion engine 1 through a connecting rod 14 reciprocates within each cylinder 2.

In addition, a throttle valve 16 for adjusting the amount (flow rate) of intake air flowing through the intake pipe 4 is arranged in the middle of the intake pipe 4. On the intake pipe 4 at a location upstream of the throttle valve 16, there is mounted an air flow meter 93 that outputs a signal corresponding to the flow rate of air flowing in the intake pipe 4. The amount of intake air sucked into the internal combustion engine 1 is metered or measured by means of this air flow meter 93.

Moreover, the internal combustion engine 1 is equipped with an EGR device 30 that serves to recirculate a part of the exhaust gas (hereinafter referred to as an EGR gas) flowing through the interior of the exhaust pipe 8 to the intake pipe 4. This EGR device 30 is constructed to be provided with an EGR passage 31, an EGR valve 32, and an EGR cooler 33. The EGR passage 31 serves to connect between the exhaust pipe 8 and the intake pipe 4 downstream of the throttle valve 16. The EGR gas is recirculated through this EGR passage 31. In addition, by adjusting the channel cross section of the EGR passage 31, the EGR valve 32 adjusts the amount of the EGR gas flowing through the EGR passage 31. The EGR cooler 33 is arranged at a location nearer to the exhaust pipe 8 than the EGR valve 32, so that heat exchange is carried out between the EGR gas passing through the EGR cooler 33 and cooling water of the internal combustion engine 1, whereby the temperature of the EGR gas is made to lower. An opening sensor 34 for measuring the degree of opening of the EGR valve 32 is mounted on the EGR valve 32.

On the intake pipe 4 in the vicinity of the internal combustion engine 1, there is mounted an in-passage fuel injection valve 81 for injecting fuel in a direction toward the intake port 3. In addition, on the internal combustion engine 1, there is mounted an in-cylinder fuel injection valve 82 for injecting fuel into each cylinder 2. Further, on the internal combustion engine 1, there is mounted a spark plug 83 for generating an electric spark in each cylinder 2.

Moreover, in the internal combustion engine 1, there is arranged in combination therewith an ECU 90 which is an electronic control unit for controlling the internal combustion engine 1. This ECU 90 is provided with a CPU, a ROM and a RAM which store a variety of kinds of programs and maps, and so on, and controls the internal combustion engine 1 in accordance with the operating conditions of the internal combustion engine 1 and/or driver's requirements. Here, note that in this embodiment, the ECU 90 corresponds to a controller in the present disclosure.

Here, an accelerator opening sensor 91 and a crank position sensor 92 in addition to the above-mentioned various kinds of sensors are electrically connected to the ECU 90. The ECU 90 receives a signal corresponding to an accelerator opening from the accelerator opening sensor 91, and calculates an engine load to be required by the internal combustion engine 1, etc., according to this signal. Also, the ECU 90 receives a signal corresponding to the rotation angle of an output shaft of the internal combustion engine 1 from the crank position sensor 92, and calculates the rotation speed of the internal combustion engine 1.

On the other hand, the EGR valve 32, the in-passage fuel injection valve 81, the in-cylinder fuel injection valve 82, and the spark plug 83 are connected to the ECU 90 through electrical wiring, so that these parts or elements are controlled by the ECU 90.

Here, when the EGR gas is supplied at the time of the idling operation of the internal combustion engine 1, and at the time of an operating state thereof close to the idling operation (i.e., at the time of a predetermined operating state), there will be a fear that the combustion state of the internal combustion engine 1 may deteriorate. For this reason, the ECU 90 makes the EGR valve 32 fully closed at the time of the predetermined operating state. That is, in cases where the internal combustion engine 1 is in the predetermined operating state, the supply of the EGR gas is stopped. The predetermined operating state is as follows: the rotation speed of the internal combustion engine is equal to or less than a predetermined rotation speed; and the engine load is equal to or less than a predetermined load. The predetermined rotation speed and the predetermined load are a rotation speed of the internal combustion engine and an engine load, respectively, in which there is a fear that the combustion state deteriorates or may deteriorate by opening the EGR valve.

Further, in cases where the EGR valve 32 is not fully closed in spite of the fact that the EGR valve 32 has been controlled so as to be fully closed, the ECU 90 makes a determination that an abnormality has occurred in the EGR valve 32. The abnormality in which the EGR valve 32 is not fully closed can be considered, for example, as the case where the EGR valve 32 is not fully closed due to sticking, or the case where the EGR valve 32 is not fully closed due to biting of foreign matter. A determination as to whether there is an abnormality in which the EGR valve 32 is not fully closed can be made based on the detected value of the opening sensor 34, and besides this, such a determination can also be made based on the negative pressure of intake air in the intake pipe 4, the air fuel ratio of exhaust gas in the exhaust pipe 8, the temperature of EGR gas in the EGR passage 31 at a location nearer to the intake pipe 4 than the EGR valve 32, the variation in combustion, or the like.

Here, in cases where the internal combustion engine 1 is in the predetermined operating state, the degree of opening of the throttle valve 16 is small, and hence, the pressure in the intake pipe 4 downstream of the throttle valve 16 becomes low (i.e., the negative pressure becomes large). However, when the EGR valve 32 is open, the EGR gas flows into the intake pipe 4 downstream of the throttle valve 16, so the pressure in the intake pipe 4 becomes high in this case (i.e., the negative pressure becomes small), as compared with the case where the EGR valve 32 is fully closed. Accordingly, in cases where there is a difference more than a predetermined pressure, as compared with the pressure in the intake pipe 4 at the time of the EGR valve 32 being fully closed, a determination can be made that the EGR valve 32 has an abnormality. The pressure in the intake pipe 4 at the time of the EGR valve 32 being fully closed can be obtained in advance through experiments, simulations, or the like. In order to make such a determination, a pressure sensor for detecting the pressure in the intake pipe 4 is arranged in the intake pipe 4 at a location downstream of the throttle valve 16. Here, note that the larger the degree of opening of the EGR valve 32, the higher the pressure in the intake pipe 4 downstream of the throttle valve 16 becomes (i.e., the smaller the negative pressure becomes).

In addition, when there occurs an abnormality of the EGR valve 32 being not fully closed, the width or range of the variation of the air fuel ratio becomes large due to the variation of combustion. Accordingly, in cases where there is a difference more than a predetermined range, as compared with the range of the variation of the air fuel ratio at the time of the EGR valve 32 being fully closed, a determination can be made that the EGR valve 32 has an abnormality. The range of the variation of the air fuel ratio can be obtained as a difference between a maximum value and a minimum value of the air fuel ratio in a predetermined period of time. The range of the variation of the air fuel ratio at the time of the EGR valve 32 being fully closed can be obtained in advance through experiments, simulations, or the like. In order to carry out such a determination, an air fuel ratio sensor for detecting the air fuel ratio in the exhaust pipe 8 is arranged in the exhaust pipe 8. Here, note that the larger the degree of opening of the EGR valve 32, the larger the range of the variation of the air fuel ratio becomes.

Moreover, in the case of the EGR valve 32 being fully closed, the EGR gas does not flow to the EGR passage 31 at a side nearer to the intake pipe 4 than the EGR valve 32. On the other hand, in the case where there occurs the abnormality of the EGR valve 32 being not fully closed, the EGR gas flows to the EGR valve 32 at the side nearer to the EGR valve 31 than the intake pipe 4. For this reason, the temperature of the EGR passage 31 at the side nearer to the intake pipe 4 than the EGR valve 32 becomes higher in the case of the EGR valve 32 being open due to the presence of an abnormality than in the case of the EGR valve 32 being fully closed. Accordingly, in cases where there is a difference more than a predetermined temperature, as compared with the temperature of the EGR passage 31 at the side nearer to the intake pipe 4 than the EGR valve 32 at the time of the EGR valve 32 being fully closed, a determination can be made that the EGR valve 32 has an abnormality. The temperature of the EGR passage 31 at the side nearer to the intake pipe 4 than the EGR valve 32 at the time of the EGR valve 32 being fully closed can be obtained in advance through experiments, simulations, or the like. In order to make such a determination, a temperature sensor for detecting the temperature of the EGR passage 31 is arranged in the EGR passage 31 at the side nearer to the intake pipe 4 than the EGR valve 32. Here, note that the larger the degree of opening of the EGR valve 32, the higher becomes the temperature in the EGR passage 31 at the side nearer to the intake pipe 4 than the EGR valve 32.

Further, when there occurs an abnormality of the EGR valve 32 being not fully closed, the variation of combustion becomes large. Accordingly, in cases where there is a difference in combustion more than a predetermined range of variation, as compared with the range of the variation of combustion at the time of the EGR valve 32 being fully closed, a determination can be made that the EGR valve 32 has an abnormality. The difference in the variation of combustion may also be a difference in the variation of the rotation speed of the internal combustion engine 1, or a difference in the variation of the pressure in the cylinder 2. That is, the rotation speed of the internal combustion engine 1 varies due to the variation of combustion, so in cases where there is a difference in the engine rotation speed more than a predetermined range of variation, as compared with the range of the variation of the engine rotation speed at the time of the EGR valve 32 being fully closed, a determination can be made that the EGR valve 32 has an abnormality. The range of the variation of the engine rotation speed can be obtained as a difference between a maximum value and a minimum value of the engine rotation speed in a predetermined period of time. In addition, the pressure in the cylinder 2 varies due to the variation of combustion therein, so in cases where there is a difference in the cylinder pressure more than a predetermined range of variation, as compared with the range of the variation of the pressure in the cylinder 2 at the time of the EGR valve 32 being fully closed, a determination can be made that the EGR valve 32 has an abnormality. The range of the variation of the pressure in the cylinder 2 can be obtained as a difference between a maximum value and a minimum value of the pressure in the cylinder 2 in a predetermined period of time. The range of variation of the engine rotation speed or the range of variation of the pressure in the cylinder 2 at the time of the EGR valve 32 being fully closed can be obtained in advance through experiments, simulations, or the like. The engine rotation speed can be detected by the crank position sensor 92. In addition, in order to detect the pressure in the cylinder 2, a pressure sensor is mounted on the cylinder 2.

Then, in cases where there has occurred an abnormality in which the EGR valve 32 is not fully closed at the time of the internal combustion engine 1 being in the predetermined operating state, the ECU 90 stops the injection of fuel from the in-passage fuel injection valve 81, and carries out the injection of fuel only from the in-cylinder fuel injection valve 82. On the other hand, when the EGR valve 32 is fully closed in the case where the internal combustion engine 1 is in the predetermined operating state, the ECU 90 can reduce noise by carrying out the injection of fuel only from the in-passage fuel injection valve 81.

Here, in the case where the internal combustion engine 1 is in the predetermined operating state, the pressure in the intake pipe 4 downstream of the throttle valve 16 is low (i.e., the negative pressure is large), and hence, when there has occurred an abnormality in which the EGR valve 32 is not fully closed, a large amount of EGR gas flows into the cylinder 2, even though the degree of opening of the EGR valve 32 is small. Moreover, the lower the rotation speed of the internal combustion engine 1, the slower the speed of the piston 15 becomes, so the gas flow in the cylinder 2 is small. When fuel is injected from the in-passage fuel injection valve 81 in such a state, the combustion state in the cylinder 2 may deteriorate, and harmful substances in the exhaust gas may increase. Further, there is also a fear that the rotation speed of the internal combustion engine 1 may drop.

On the other hand, when fuel is injected from the in-cylinder fuel injection valve 82, the gas flow inside the cylinder 2 is promoted by the penetration force of the fuel, thus making it possible to form a better mixture. As a consequence, the deterioration in the combustion state can be suppressed. Thus, it is possible to reduce the harmful substances in the exhaust gas as well as to suppress the rotation speed of the internal combustion engine from dropping. Accordingly, in cases where there has occurred an abnormality in which the EGR valve 32 is not fully closed at the time of the internal combustion engine 1 being in the predetermined operating state, the ECU 90 stops the injection of fuel from the in-passage fuel injection valve 81, and carries out the injection of fuel only from the in-cylinder fuel injection valve 82, whereby the deterioration of the combustion state as well as the decrease of the engine rotation speed can be suppressed.

FIG. 2 is a flow chart showing a flow or routine for fuel injection control according to this first embodiment. The routine in this flow chart is carried out by means of the ECU 90 at each predetermined time interval. The control according to the routine in FIG. 2 corresponds to first control in the present disclosure.

In step S101, it is determined whether the internal combustion engine 1 is a predetermined operating state. The predetermined operating state is an operating state in which the EGR valve 32 is fully closed, and is set in advance such that in the case where there has occurred an abnormality in which the EGR valve 32 is not fully closed, there is a fear that the combustion state may deteriorate. Here, note that the predetermined operating state may also be an idling operation state. In cases where an affirmative determination is made in step S101, the routine goes to step S102. On the other hand, in cases where a negative determination is made in step S101, this flow chart or routine is ended. In cases where this flow chart or routine is ended, fuel is caused to be injected from at least one of the in-passage fuel injection valve 81 and the in-cylinder fuel injection valve 82, according to the operating state of the internal combustion engine 1.

In step S102, it is determined whether the abnormality of the EGR valve 32 being not fully closed has occurred. Here, in cases where the internal combustion engine 1 is the predetermined operating state, the ECU 90 operates the EGR valve 32 so that the EGR valve 32 is fully closed. Accordingly, in step S102, in cases where the EGR valve 32 is open, a determination is made that the abnormality of the EGR valve 32 being not fully closed has occurred. A determination as to whether there is an abnormality in which the EGR valve 32 is not fully closed can be made based on the detected value of the opening sensor 34, and besides this, such a determination can also be made based on the negative pressure of intake air in the intake pipe 4, the air fuel ratio of exhaust gas in the exhaust pipe 8, the temperature of EGR gas in the EGR passage 31 at a location nearer to the intake pipe 4 than the EGR valve 32, the variation in combustion, and so on. In cases where an affirmative determination is made in step S102, the routine goes to step S103, whereas in cases where a negative determination is made, the routine goes to step S104.

In step S103, the in-cylinder fuel injection valve 82 is selected. Because the injection of fuel is carried out only from the in-cylinder fuel injection valve 82, the gas flow in the cylinder 2 can be promoted.

On the other hand, in step S104, the in-passage fuel injection valve 81 is selected. Thus, the injection of fuel only from the in-passage fuel injection valve 81 is carried out, so noise can be reduced.

As described above, according to this embodiment, in cases where there has occurred an abnormality in which the EGR valve 32 is not fully closed at the time of the internal combustion engine 1 being in the predetermined operating state, fuel is caused to be injected only from the in-cylinder fuel injection valve 82. For this reason, even though the EGR gas flows into the cylinder 2, it is possible to suppress the combustion state therein from being deteriorated. On the other hand, in cases where there is no abnormality in the EGR valve 32, noise can be reduced by causing fuel to be injected only from the in-passage fuel injection valve 81.

(Second Embodiment)

In the first embodiment, in cases where there has occurred an abnormality in which the EGR valve 32 is not fully closed, fuel is caused to be injected only from the in-cylinder fuel injection valve 82, without regard to the degree of opening of the EGR valve 32. On the other hand, even in cases where there has occurred an abnormality in which the EGR valve 32 is not fully closed, fuel is caused to be injected only from the in-passage fuel injection valve 81, if the abnormality is within an allowable range. The other devices, parts and so on in this second embodiment are the same as those in the first embodiment, so the explanation thereof is omitted.

Here, even though there has occurred the abnormality of the EGR valve 32 being not fully closed, if the combustion state does not deteriorate, fuel may be injected only from the in-passage fuel injection valve 81, without causing any problem. In addition, the combustion state, if deteriorated, may be in the allowable range. Then, by selecting the in-passage fuel injection valve 81 within a range causing no problem, noise can be reduced to a further extent.

Here, FIG. 3 is a view showing the relation between the amount of EGR gas and the temperature of a catalyst at the time of idling operation. The catalyst is, for example, an oxidation catalyst or a three-way catalyst, which is arranged in the exhaust pipe 8. In FIG. 3, a solid line indicates a case where fuel has been injected only from the in-cylinder fuel injection valve 82, and a broken line indicates a case where fuel is injected only from the in-passage fuel injection valve 81.

The more the amount of EGR gas, the worse the combustion state becomes, and the more the amount of unburnt fuel in the exhaust gas increases, so the higher the temperature of the catalyst becomes. In this embodiment, when the amount of EGR gas is less than a first threshold value indicated by A in FIG. 3, fuel is injected from the in-passage fuel injection valve 81. Here, in the amount of EGR gas being equal to or larger than a second threshold value indicated by B in FIG. 3, when fuel is injected only from the in-passage fuel injection valve 81, the rotation speed of the internal combustion engine 1 drops. Accordingly, when the amount of EGR gas is equal to or larger than the first threshold value indicated by A in FIG. 3, which gives a margin more than when the amount of EGR is the second threshold value indicated by B in FIG. 3, switching is made to the in-cylinder fuel injection valve 82.

FIG. 4 is a flow chart showing a flow or routine for fuel injection control according to this second embodiment. The routine in this flow chart is carried out by means of the ECU 90 at each predetermined time interval. For those steps in which the same processings as in the aforementioned flow chart in FIG. 2 are carried out, the same symbols are attached and the explanation thereof is omitted. The control according to the routine in FIG. 4 corresponds to the first control in the present disclosure.

In this flow chart, when an affirmative determination is made in step S102, the routine goes to step S201. In step S201, it is determined whether the amount of EGR gas flowing into the cylinder 2 is equal to or larger than the first threshold value A. The first threshold value A is an amount of EGR gas shown by A in FIG. 3. Here, note that the amount of EGR gas flowing into the cylinder 2 may be directly detected, but instead of this, the amount of EGR gas may be estimated by the use of a physical quantity which has a correlation to the amount of EGR gas. Moreover, by comparing the physical quantity having a correlation to the amount of EGR gas with a threshold value, it may be determined whether the amount of EGR gas is equal to or more than the first threshold value A.

For example, the larger the degree of opening of the EGR valve 32, the more the amount of EGR gas becomes, and the larger the degree of opening of the EGR valve 32 detected by the opening sensor 34 becomes. As a result, a threshold value is set for the degree of opening of the EGR valve 32 detected by the opening sensor 34, and in cases where the degree of opening of the EGR valve 32 detected by the opening sensor 34 is equal to or larger than this threshold value, a determination can be made that the amount of EGR gas is equal to or more than the first threshold value A. Here, note that the relation between the degree of opening of the EGR valve 32 and the amount of EGR gas can be obtained in advance through experiments, simulations, or the like.

In addition, for example, the larger the degree of opening of the EGR valve 32, the more the amount of EGR gas becomes, and the higher the pressure in the intake pipe 4 downstream of the throttle valve 16 becomes (i.e., the smaller the negative pressure becomes). As a result, a threshold value is set for the pressure in the intake pipe 4, and in cases where the pressure in the intake pipe 4 is equal to or larger than this threshold value, a determination can be made that the amount of EGR gas is equal to or more than the first threshold value A. Here, note that the relation between the pressure in the intake pipe 4 and the amount of EGR gas can be obtained in advance through experiments, simulations, or the like.

Moreover, for example, the larger the degree of opening of the EGR valve 32, the more the amount of EGR gas becomes, and the larger the variation of combustion becomes. Accordingly, a threshold value is set for the range of the variation of the engine rotation speed or for the range of the variation of the pressure in the cylinder 2, and in cases where the range of the variation of the engine rotation speed or the range of the variation of the pressure in the cylinder 2 is equal to or larger than the threshold value, a determination can be made that the amount of EGR gas is equal to or more than the first threshold value A. Here, note that the relation between the range of the variation of the engine rotation speed or the range of the variation of the pressure in the cylinder 2 and the amount of EGR gas can be obtained in advance through experiments, simulations, or the like.

Further, for example, the larger the degree of opening of the EGR valve 32, the more the amount of EGR gas becomes, and the larger the variation of the air fuel ratio becomes. As a result, a threshold value is set for the range of the variation of the air fuel ratio, and in cases where the range of the variation of the air fuel ratio is equal to or larger than this threshold value, a determination can be made that the amount of EGR gas is equal to or more than the first threshold value A. Here, note that the relation between the range of the variation of the air fuel ratio and the amount of EGR gas can be obtained in advance through experiments, simulations, or the like.

Furthermore, for example, the larger the degree of opening of the EGR valve 32, the more the amount of EGR gas becomes, and the higher the temperature in the EGR passage 31 at the side nearer to the intake pipe 4 than the EGR valve 32 becomes. Accordingly, a threshold value is set for this temperature, and in cases where this temperature is equal to or higher than this threshold value, a determination can be made that the amount of EGR gas is equal to or more than the first threshold value A. Here, note that the relation between the temperature in the EGR passage 31 at the side nearer to the intake pipe 4 than the EGR valve 32 and the amount of EGR gas can be obtained in advance through experiments, simulations, or the like.

Then, in cases where an affirmative determination is made in step S201, the routine goes to step S103, and on the other hand, in cases where a negative determination is made, the routine goes to step S104.

As described above, according to this second embodiment, when the amount of EGR gas is in the allowable range, fuel is caused to be injected from the in-passage fuel injection valve 81, so that noise can be reduced to a further extent, while suppressing the decrease in the engine rotation speed.

(Third Embodiment)

In the first embodiment, in cases where the internal combustion engine 1 is the predetermined operating state, fuel is caused to be injected from at least one of the in-passage fuel injection valve 81 and the in-cylinder fuel injection valve 82. On the other hand, in this third embodiment, even in cases where the internal combustion engine 1 is in the predetermined operating state, fuel is caused to be injected from both the in-passage fuel injection valve 81 and the in-cylinder fuel injection valve 82. Moreover, in this embodiment, in the case where the internal combustion engine 1 is in the predetermined operating state and the EGR valve 32 has an abnormality, the amount of fuel to be injected from the in-cylinder fuel injection valve 82 is caused to be increased more than in the case where the internal combustion engine 1 is in the predetermined operating state and there is no abnormality in the EGR valve 32, so that the amount of fuel to be injected from the in-passage fuel injection valve 81 is decreased by the amount of fuel thus increased. The other devices, parts and so on in this third embodiment are the same as those in the first embodiment, so the explanation thereof is omitted.

Here, it can also be considered that in cases where the internal combustion engine 1 is in the predetermined operating state, fuel is caused to be injected from both the in-passage fuel injection valve 81 and the in-cylinder fuel injection valve 82. In such a case, in cases where the EGR valve 32 has an abnormality, the gas flow in the cylinder 2 can be promoted by increasing the amount of fuel injection from the in-cylinder fuel injection valve 82, so that the rotation speed of the internal combustion engine 1 can be suppressed from dropping. If only the amount of fuel injection from the in-cylinder fuel injection valve 82 is caused to increase, engine torque will be increased, and hence, to avoid such a situation, the amount of fuel injection from the in-passage injection valve 81 is caused to decrease. In order to increase the amount of fuel injection from the in-cylinder fuel injection valve 82, at least one of whether the injection period of fuel is extended, and whether the injection pressure of fuel is increased, may be carried out.

The ECU 90 calculates a total amount of fuel to be supplied to the internal combustion engine 1 (hereinafter referred to as a total amount of fuel injection) based on the amount of intake air detected by the air flow meter 93. The total amount of fuel injection is the sum of the amount of fuel injection from the in-passage injection valve 81, and the amount of fuel injection from the in-cylinder fuel injection valve 82. Then, the ECU 90 divides the total amount of fuel injection between the amount of fuel to be injected from the in-passage fuel injection valve 81 and the amount of fuel to be injected from the in-cylinder fuel injection valve 82. Hereinafter, the ratio of the amount of fuel to be injected from the in-passage fuel injection valve 81 and the amount of fuel to be injected from the in-cylinder fuel injection valve 82 in the case where the EGR valve 32 is normal is referred to as a normal-time injection ratio, and in addition, the ratio of the amount of fuel to be injected from the in-passage fuel injection valve 81 and the amount of fuel to be injected from the in-cylinder fuel injection valve 82 in the case where there has occurred an abnormality in which the EGR valve 32 is not fully closed is referred to as an abnormal-time injection ratio. The normal-time injection ratio has been set in advance. The abnormal-time injection ratio is set in such a manner that the amount of fuel injection from the in-cylinder fuel injection valve 82 becomes large, and the amount of fuel injection from the in-passage injection valve 81 becomes small, as compared with those at the normal-time injection ratio. Whichever is selected between the abnormal-time injection ratio and the normal-time injection ratio, the total amount of fuel injection is the same. Optimum values for the abnormal-time injection ratio and the normal-time injection ratio can be obtained, respectively, by experiments, simulations, or the like.

FIG. 5 is a flow chart showing a flow or routine for fuel injection control according to this third embodiment. The routine in this flow chart is carried out by means of the ECU 90 at each predetermined time interval. For those steps in which the same processings as in the aforementioned flow charts in FIGS. 2 and 4 are carried out, the same symbols are attached and the explanation thereof is omitted. The control according to the routine in FIG. 5 corresponds to the first control in the present disclosure.

In this flow chart, when an affirmative determination is made in step S201, the routine goes to step S301. In step S301, the ratio of the amount of fuel to be injected from the in-passage fuel injection valve 81 and the amount of fuel to be injected from the in-cylinder fuel injection valve 82 is set to the abnormal-time injection ratio. On the other hand, in cases where a negative determination is made in step S102, or in cases where a negative determination is made in step S201, the routine goes to step S302. In step S302, the ratio of the amount of fuel to be injected from the in-passage fuel injection valve 81 and the amount of fuel to be injected from the in-cylinder fuel injection valve 82 is set to the normal-time injection ratio.

Here, note that in the flow chart shown in FIG. 5, the step S201 can also be omitted. In this case, in cases where an affirmative determination is made in step S102, the routine goes to step S301, and on the other hand, in cases where a negative determination is made, the routine goes to step S302.

In this manner, according to this third embodiment, in cases where there has occurred an abnormality in which the EGR valve 32 is not fully closed, the ratio of the amount of fuel injection from the in-cylinder fuel injection valve 82 with respect to the total amount of fuel injection is made high, so that the deterioration in the state of combustion can be suppressed. On the other hand, in cases where the EGR valve 32 is normal, the ratio of the amount of fuel injection from the in-cylinder fuel injection valve 82 with respect to the total amount of fuel injection becomes relatively low, and so, noise can be reduced.

Here, note that in this embodiment, in step S301, the ratio of the amount of fuel to be injected from the in-passage fuel injection valve 81 and the amount of fuel to be injected from the in-cylinder fuel injection valve 82 may be changed according to the amount of EGR gas flowing into the cylinder 2. In this case, the larger the amount of EGR gas flowing into the cylinder 2, the larger the amount of fuel to be injected from the in-cylinder fuel injection valve 82 is made, and the smaller the amount of fuel to be injected from the in-passage fuel injection valve 81 is made. That is, the larger the amount of EGR gas flowing into the cylinder 2, the higher the ratio of the amount of fuel injection from the in-cylinder fuel injection valve 82 with respect to the total amount of fuel injection may also be made. Even in such a case, the step S201 can also be omitted. The larger the amount of EGR gas flowing into the cylinder 2, the easier the state of combustion therein becomes to deteriorate, so that the deterioration in the state of combustion can be suppressed, by making the ratio of the amount of fuel injection from the in-cylinder fuel injection valve 82 with respect to the total amount of fuel injection higher according to the increasing amount of EGR gas flowing into the cylinder 2. In addition, noise can be reduced by decreasing the amount of fuel injection from the in-cylinder fuel injection valve 82 according to the decreasing amount of EGR gas flowing into the cylinder 2. The relation between the amount of EGR gas flowing into the cylinder 2 and the abnormal-time injection ratio can be obtained in advance through experiments, simulations, or the like.

(Fourth Embodiment)

In this fourth embodiment, in cases where the internal combustion engine 1 is in the predetermined operating state, fuel is injected from both the in-passage fuel injection valve 81 and the in-cylinder fuel injection valve 82. Moreover, in this embodiment, in cases where there has occurred an abnormality in which the EGR valve 32 is not fully closed, the injection pressure of fuel in the in-cylinder fuel injection valve 82 is made to increase. In this case, the amount of fuel injection from the in-cylinder fuel injection valve 82 may be made unchanged, or the ratio of the amount of fuel injection from the in-cylinder fuel injection valve 82 with respect to the total amount of fuel injection may be made high. By increasing the injection pressure of fuel in the in-cylinder fuel injection valve 82, the gas flow in the cylinder 2 is promoted, thus making it possible to suppress the state of combustion therein from being deteriorated, even without increasing the amount of fuel injection. In addition, the injection pressure of fuel in the in-cylinder fuel injection valve 82 may be made to increase, while increasing the amount of fuel injection from the in-cylinder fuel injection valve 82. Here, note that in this fourth embodiment, in cases where the internal combustion engine 1 is in the predetermined operating state, fuel may be injected from only the in-cylinder fuel injection valve 82.

The injection pressure of fuel in the in-cylinder fuel injection valve 82 can be changed by using a well-known high pressure fuel pump. FIG. 6 is a view showing the schematic construction of a high pressure fuel pump 50. A pressurizing chamber 51 for pressurizing fuel is formed in the high pressure fuel pump 50. An inlet side fuel passage 52 and an outlet side fuel passage 53 are connected to the pressurizing chamber 51. Fuel delivered from a low pressure fuel pump flows through the inlet side fuel passage 52. The in-cylinder fuel injection valve 82 is connected to a downstream side portion of the outlet side fuel passage 53. In FIG. 6, fuel flows in the direction of an arrow.

At the inlet side of the pressurizing chamber 51, there is arranged an electromagnetic spill valve 54 that is driven to open and close by means of a signal from the ECU 90. In addition, the pressurizing chamber 51 is provided with a plunger 55 that is driven to move up and down under the action of a cam. Fuel is sucked into the pressurizing chamber 51 by the downward movement of the plunger 55, and the fuel in the pressurizing chamber 51 is pressurized by the upward movement of the plunger 55. When the electromagnetic spill valve 54 is open at the time of the plunger 55 going up, fuel flows back to the inlet side fuel passage 52 so that the injection pressure of fuel does not become high. In the course of the plunger 55 going up, the pressurization of fuel begins from a point in time at which the electromagnetic spill valve 54 is closed. Then, by adjusting the timing to close the electromagnetic spill valve 54 during the course of the plunger 55 going up, the injection pressure of fuel can be adjusted. For example, the earlier the timing to close the electromagnetic spill valve 54, the higher the injection pressure of fuel becomes. Here, note that the injection pressure of fuel can also be adjusted by means of other mechanisms.

FIG. 7 is a flow chart showing a flow or routine for fuel injection control according to this fourth embodiment. The routine in this flow chart is carried out by means of the ECU 90 at each predetermined time interval. For those steps in which the same processings as in the aforementioned flow charts in FIGS. 2, 4 and 5 are carried out, the same symbols are attached and the explanation thereof is omitted. The control according to the routine in FIG. 7 corresponds to second control in the present disclosure.

In this flow chart, when an affirmative determination is made in step S201, the routine goes to step S401. In step S401, the injection pressure of fuel in the in-cylinder fuel injection valve 82 is set to an abnormal-time injection pressure. The abnormal-time injection pressure is higher as compared with a normal-time injection pressure which will be described later, and it is a pressure which is set when an abnormality has occurred in which the EGR valve 32 is not fully closed. On the other hand, in cases where a negative determination is made in step S102, or in cases where a negative determination is made in step S201, the routine goes to step S402. In step S402, the injection pressure of fuel in the in-cylinder fuel injection valve 82 is set to the normal-time injection pressure. The normal-time injection pressure is lower than the abnormal-time injection pressure, and is a pressure which is set when the EGR valve 32 is normal. Here, note that optimum values for the abnormal-time injection pressure and the normal-time injection pressure have been obtained in advance, respectively, by experiments, simulations, or the like.

Here, note that in the flow chart shown in FIG. 7, the step S201 can also be omitted. In this case, in cases where an affirmative determination is made in step S102, the routine goes to step S401, and on the other hand, in cases where a negative determination is made, the routine goes to step S402.

In this manner, according to this fourth embodiment, in cases where there has occurred an abnormality in which the EGR valve 32 is not fully closed, the injection pressure of fuel in the in-cylinder fuel injection valve 82 is made high, so that the deterioration in the state of combustion can be suppressed. On the other hand, in cases where the EGR valve 32 is normal, the injection pressure of fuel in the in-cylinder fuel injection valve 82 becomes relatively low, and so, noise can be reduced.

In this fourth embodiment, in step S401, the abnormal-time injection pressure may be changed according to the amount of EGR gas flowing into the cylinder 2. In this case, the larger the amount of EGR gas flowing into the cylinder 2, the higher the abnormal-time injection pressure may also be made. Even in such a case, the step S201 can also be omitted. The larger the amount of EGR gas flowing into the cylinder 2, the easier the state of combustion therein becomes to deteriorate, so that the deterioration in the state of combustion can be suppressed, by making the pressure of fuel to be injected from the in-cylinder fuel injection valve 82 according to the increasing amount of EGR gas flowing into the cylinder 2. In addition, noise can be reduced by making the pressure of fuel to be injected from the in-cylinder fuel injection valve 82 lower according to the decreasing amount of EGR gas flowing into the cylinder 2. The relation between the amount of EGR gas flowing into the cylinder 2 and the abnormal-time injection pressure can be obtained in advance through experiments, simulations, or the like.

The invention claimed is:

1. A control system for an internal combustion engine comprising:
   an in-passage fuel injection valve configured to inject fuel into an intake passage of the internal combustion engine;
   an in-cylinder fuel injection valve configured to inject fuel into a cylinder of said internal combustion engine;
   an EGR device that has an EGR passage connecting between an exhaust passage and the intake passage of said internal combustion engine, and an EGR valve for opening and closing the EGR passage; and
   a controller configured to carry out at least one of first control and second control, in cases where said internal combustion engine is in a predetermined operating state in which said EGR valve is caused to be fully closed when a rotation speed of said internal combustion engine is equal to or less than a predetermined rotation speed and when a load of said internal combustion engine is equal to or less than a predetermined load, said first control being that an amount of fuel to be injected from said in-passage fuel injection valve is made smaller, and an amount of fuel to be injected from said in-cylinder fuel injection valve is made larger, in the case where there is an abnormality in which said EGR valve is not fully closed, than in the case where there is no said abnormality, and said second control being that a pressure of fuel to be injected from said in-cylinder fuel injection valve is made higher, in the case where there is an abnormality in which said EGR valve is not fully closed, than in the case where there is no said abnormality.

2. The control system for an internal combustion engine as set forth in claim 1, wherein
   said controller carries out neither said first control nor said second control when the amount of EGR gas flowing into said cylinder is less than a threshold value, even in the case where said internal combustion engine is in said predetermined operating state, and in the case where there is said abnormality.

3. The control system for an internal combustion engine as set forth in claim 1, wherein
   in the case of carrying out said first control, said controller decreases the amount of fuel to be injected from said in-passage fuel injection valve and at the same time increases the amount of fuel to be injected from said in-cylinder fuel injection valve, in accordance with the increasing amount of EGR gas flowing into said cylinder.

4. The control system for an internal combustion engine as set forth in claim 1, wherein in the case of carrying out said second control, said controller makes the pressure of fuel to be injected from said in-cylinder fuel injection valve higher in accordance with the increasing amount of EGR gas flowing into said cylinder.

* * * * *